(12) United States Patent
Cugnini et al.

(10) Patent No.: US 6,389,070 B1
(45) Date of Patent: May 14, 2002

(54) DEVICE FOR INDICATING THE RECEIVED SIGNAL QUALITY IN A DIGITAL TELEVISION RECEIVER

(75) Inventors: Aldo G. Cugnini, Ossining, NY (US); David L. Rossmere, San Jose, CA (US)

(73) Assignee: Philips Electronics North America Corporation, New York, NY (US)

(*) Notice: Subject to any disclaimer, the term of this patent is extended or adjusted under 35 U.S.C. 154(b) by 0 days.

(21) Appl. No.: 09/282,322

(22) Filed: Mar. 31, 1999

(51) Int. Cl.[7] .............................. H03H 7/30; H03H 7/40; H03K 5/159
(52) U.S. Cl. ...................... 375/232; 375/228; 348/569; 455/67.3
(58) Field of Search ................................ 375/232, 228, 375/321; 348/241, 569, 570; 455/67.1, 67.3

(56) References Cited

U.S. PATENT DOCUMENTS

| | | | | |
|---|---|---|---|---|
| 4,214,273 A | * | 7/1980 | Brown ........................ 348/569 |
| 4,605,968 A | * | 8/1986 | Hayashi ....................... 348/570 |
| 4,935,814 A | * | 6/1990 | Omoto et al. ................ 348/193 |
| 5,436,675 A | * | 7/1995 | Hayashi et al. ............. 348/725 |
| 5,671,253 A | * | 9/1997 | Stewart ....................... 375/316 |
| 5,966,186 A | * | 10/1999 | Shigihara et al. ........... 348/570 |

* cited by examiner

*Primary Examiner*—Chi Pham
*Assistant Examiner*—Phuong Phu

(57) ABSTRACT

A device for indicating the quality of a received digital broadcast video signal in a digital television receiver includes circuitry for determining the amount of multipath interference. The device generates a display graph indicative of the signal quality. Optionally, the device may also consider, in determining the signal quality, whether a demodulator in the television receiver is able to lock onto a sync sequence in the video signal, whether an adaptive equalizer also in the television receiver is able to lock onto the sync sequence, and the amount of errors being corrected in an error correction circuit in the television receiver.

8 Claims, 5 Drawing Sheets

DEVICE FOR INDICATING THE RECEIVED SIGNAL QUALITY IN A DIGITAL TELEVISION RECEIVER

BACKGROUND OF THE INVENTION

1. Field of the Invention

The subject invention relates to television receivers, and in particular, to digital television receivers.

2. Description of the Related Art

Consumer FM receivers sometimes have a signal-strength meter which can be used to help orient an antenna for maximum received signal strength. Such an aid is never used in analog television receivers, where the signal quality has a direct relationship to the observed picture quality. In such analog television receivers, the picture quality is a continuously-varying direct measure of the signal quality.

In a digital television receiver, the quality of the displayed picture does not bear a direct, continuously-varying relationship to the received signal quality. This is due to the sharp threshold of the receiver's error-correction capability when faced with a compromised input signal. This results in the so-called "cliff effect", where the receiver performance is binary, i.e., as the received signal quality degrades, the picture is either "perfectly" displayed, or there is essentially no picture at all. This creates a difficulty in orienting the receiving antenna for best performance, as there is a poor correlation between the continuously-variable antenna position and the "all-or-nothing" displayed picture quality.

European Patent Application EP 0 818 923 discloses a digital broadcast receiving device which includes circuitry for determining a received signal quality and for displaying this received signal quality on the display screen of the receiving device. Using this displayed received signal quality, a user is able to properly position the receiving antenna to achieve a maximum received signal quality.

As is common in digital signal processing devices, e.g., compact disc players, this receiving device includes an error detecting/correcting circuit for detecting and correcting transmission errors in the broadcasting data. This circuit includes detecting means for detecting the transmission errors, calculating means for calculating the error rate from the detection results, and correcting means for correcting the detected transmission errors. This circuit calculates the number of errors that have occurred in the broadcasting data and the amount of data that has passed through the circuit. The circuit then calculates the error rate of the data, i.e., "the number of errors/the amount of passed data" and applies the error rate to a controller. The controller then converts the error rate into a received signal quality signal which is then displayed on the screen of the receiving device.

While the error rate in the received signal may be looked at as a measure of the received signal quality, Applicants have found that other factors, including multipath interference, have significant impact on the received signal quality. Multipath interference occurs when the same broadcast signal is received at different times due to different transmission paths. These different transmission paths may result from the reception of a broadcast signal directly from the transmitter, and, at the same time, the reception of the same broadcast signal having been reflected from, for example, a building or a mountain. This multipath interference causes signal distortion and degradation in system performance, due to uncorrectable errors in the digital decoder.

SUMMARY OF THE INVENTION

It is an object of the present invention to provide a signal quality indicator (SQI) signal for a digital television receiver which is sensitive to multipath interference.

This object is achieved in a device for generating a signal quality indicator (SQI) signal for indicating a signal quality of a received digital broadcast signal for a digital receiver comprising an antenna for receiving digital broadcast signals, a tuner for selectively tuning to one of said digital broadcast signals, a variable gain amplifier for amplifying the tuned signal to a predetermined level, a demodulator for demodulating the tuned signal, said demodulator having a control output for supplying an automatic gain control (AGC) signal to the variable gain amplifier, an adaptive equalizer, said adaptive equalizer generating weighting coefficients for adapting the processing in the adaptive equalizer, and signal processing circuitry for processing the equalized tuned signal, wherein the SQI signal generating device comprises means for acquiring the weighting coefficients generated in said adaptive equalizer, wherein said weighting coefficients include a main weighting coefficient and subordinate weighting coefficients; means for comparing said subordinate weighting coefficients with said main weighting coefficient; and means for generating said SQI signal for indicating the quality of said received digital broadcast signal based on said comparison.

It is known that an effective way to cope with multipath interference is to use adaptive equalization, which can restore the impaired signal by using a known training signal or the data itself. An adaptive equalizer includes a cascade arrangement of delays and a plurality of multipliers coupled to the input and output of the cascade arrangement and also to the nodes between the delays. The outputs from these multipliers are then combined in a summing arrangement, the output from the summing arrangement forming the output of the adaptive equalizer. Depending on the amount of multipath interference, the adaptive equalizer generates weighting coefficients for the multipliers.

Applicants have found that the amount of work being performed by the adaptive equalizer is a measure of the amount of multipath interference, and as such, an indication of the quality of the received digital broadcast. To that end, a comparison of the main weighting coefficient to the other subordinate weighting coefficients is thus a measure of the amount of work being performed by the adaptive equalizer.

In a modified embodiment of the invention, the device is characterized in that said comparing means comprises means for determining an RMS value for each of the weighting coefficients; means for forming a sum of the RMS values for the subordinate weighting coefficients; and means for dividing the RMS value of the main weighting coefficient by the sum of the RMS values for the subordinate weighting coefficients thereby forming the SQI signal, whereby the higher the value of the SQI signal, the less the adaptive equalizer is working and, in turn, the higher the quality of the received digital broadcast signal.

One way of comparing the weighting coefficients of the adaptive equalizer is to divide the RMS value of the main weighting coefficient by the sum of the RMS values of the subordinate weighting coefficients. As such, the higher the value of the SQI signal formed by this algorithm, the less the adaptive equalizer is working and, in turn, the higher the quality of the received digital broadcast signal.

In order to provide a visual indication of the SQI signal, the device is characterized in that the device further comprises a graphics generator for generating a quantitative signal based on said SQI signal, an output of said graphics generator being applied to a display.

Applicants have further found that while the amount that the adaptive equalizer is working is a measure of the received signal quality, a more comprehensive indication could be achieved by a combination of the working of the adaptive equalizer, the error rate, as well as other factors.

To that end, the subject invention includes a device for indicating a signal quality of a received digital broadcast video signal for a digital television receiver comprising an antenna for receiving digital broadcast video signals, a tuner for selectively tuning to one of said digital broadcast video signals, a variable gain amplifier for amplifying the tuned video signal to a predetermined level, a demodulator for demodulating the tuned video signal, said demodulator having a control output for supplying an automatic gain control (AGC) signal to the variable gain amplifier, an adaptive equalizer, said adaptive equalizer generating weighting coefficients for adapting the processing in the adaptive equalizer, an error detecting/correcting circuit for determining an error rate in the received digital broadcast video signal, video signal processing circuitry for processing the equalized tuned video signal, and a display for displaying the video signal, wherein the signal quality indicating device comprises first means for determining whether the demodulator is able to lock onto a sync sequence in the received digital broadcast video signal; second means for determining whether the adaptive equalizer is able to lock onto said sync. sequence; means for acquiring the weighting coefficients generated in said adaptive equalizer, wherein said weighting coefficients weights include a main weighting coefficient and subordinate weighting coefficients; means for comparing said subordinate weighting coefficients with said main weighting coefficient; and means for generating said SQI signal for indicating the quality of said received digital broadcast video signal based on said first determining means, said second determining means, said error rate, and said weighting coefficient comparison.

BRIEF DESCRIPTION OF THE DRAWINGS

With the above and additional objects and advantages in mind as will hereinafter appear, the invention will be described with reference to the accompanying drawings, in which.

DESCRIPTION OF THE PREFERRED EMBODIMENTS

Figure 1:
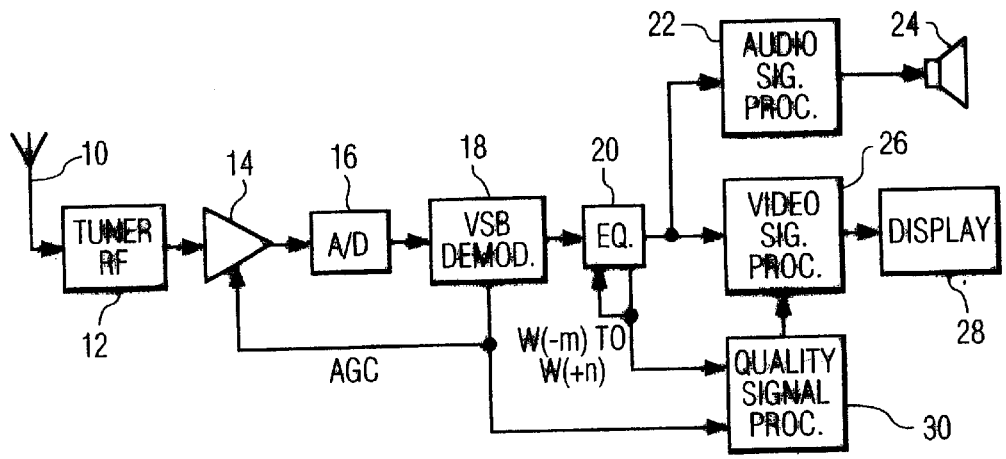
FIG. 1 shows a block diagram of a television receiver incorporating the subject invention.

FIG. 1 shows a block diagram of a television receiver incorporating the quality signal processor of the subject invention. In particular, an antenna 10 receives digital broadcast video signals. The antenna 10 is connected to a tuner/rf section 12 for tuning to one of the received video signals. The output from the tuner/rf section 12 is connected to a variable gain amplifier 14 for amplifying the tuned video signal to a predetermined level. The output from the variable gain amplifier 14 is connected through an analog-to-digital (A/D) converter 16 to an input of a vestigial sideband (VSB) demodulator 18 for demodulating the tuned video signal. Depending on the signal level of the tuned video signal, the VSB demodulator 18 generates an automatic gain control (AGC) signal for application to the variable gain amplifier 14. An adaptive equalizer 20 is connected to the output of the VSB demodulator 18 for suppressing the effect of any multipath interference. To that end, the adaptive equalizer 20 generates weighting coefficients which are used by the adaptive equalizer 20. An output from the adaptive equalizer is then applied to an audio signal processor 22 for generating sound signals for application to loudspeakers 24. The output from the adaptive equalizer 20 is also applied to a video signal processor 26 for generating color signals for application to a display screen 28.

As indicated above, in a digital television receiver, the quality of the displayed picture does not bear a direct, continuously-varying relationship to the received signal quality. Hence, the television receiver includes a quality signal processor 30 for generating a quality signal for application to the video signal processor 26 such that the quality signal may be displayed on the display screen 28. The quality signal processor 30 receives the AGC signal from the VSB demodulator 18 as well as the weighting coefficients from the adaptive equalizer 20.

Figure 2:
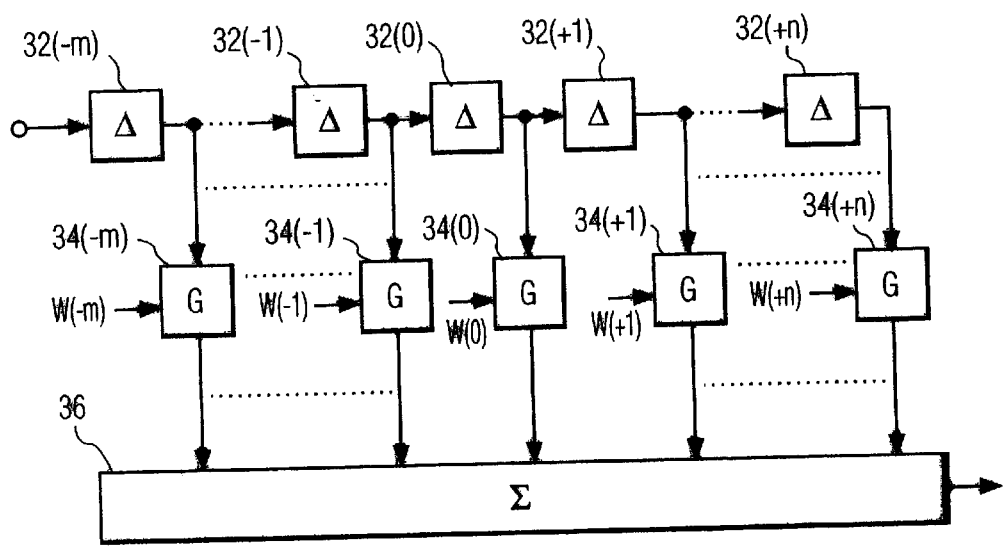
FIG. 2 shows a block diagram of an adaptive equalizer.

FIG. 2 shows a block diagram of the adaptive equalizer 20. The demodulated video signal is applied to a cascade arrangement of delay elements 32(−m), . . . , 32(0), . . . , 32(n). A plurality of multipliers 34(−m), . . . , 34(0), . . . , 34(n) are connected to the outputs of the delay elements in the cascade arrangement. The outputs from the multipliers are then summed in a summing arrangement 36, the output of this summing arrangement forming the output of the adaptive equalizer 20. In a known manner (not shown), the adaptive equalizer 20 generates weighting coefficients W(−m), . . . , W(0), . . . , W(n) for the respective multipliers. Depending on the amount of multipath interference, the adaptive equalizer 20 adjusts the weights of the subordinate weighting coefficients with respect to the main weighting coefficient W(0).

Figure 3:
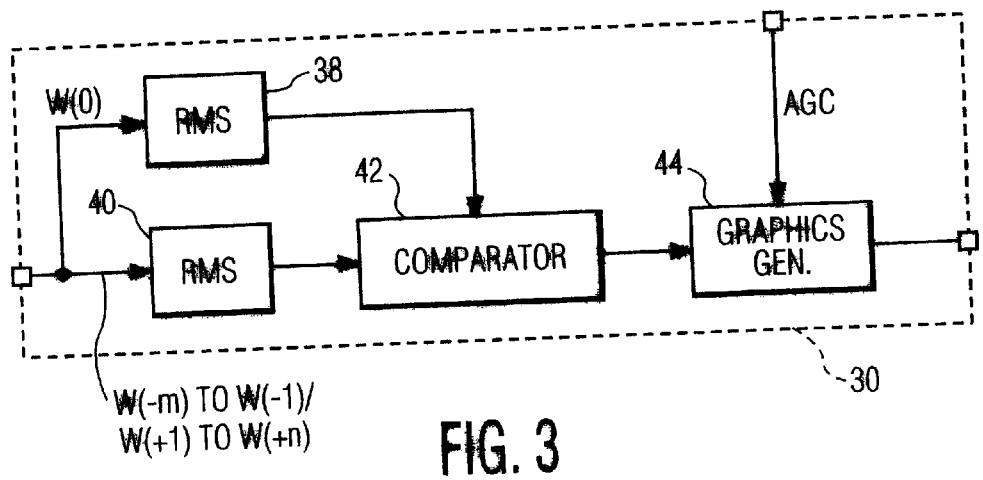
FIG. 3 shows a block diagram of a first embodiment of a quality signal processor according to the invention.

The signal quality processor 30 uses these weighting coefficients, along with the AGC signal to generate the SQI signal. Any known algorithm may be used to process these signals. FIG. 3 shows an embodiment of the signal quality processor 30 in which an RMS processor 38 forms the RMS value for the main weighting coefficient W(0), and a summing RMS processor 40 forms the sum of the RMS values of the remaining subordinate weighting coefficients. A comparator 42 then compares the outputs from the first and second RMS processors 38 and 40 and forms the SQI signal. This comparator 42 may be a divider which divides the signal from the RMS processor 38 by the signal from the summing RMS processor 40. The output from the comparator 42 is then applied to a graphics generator 44 which also receives the AGC signal. The graphics generator 44 then generates a SQI signal graph and a signal strength graph for display which is then applied to the video signal processor 26.

Figure 4A:
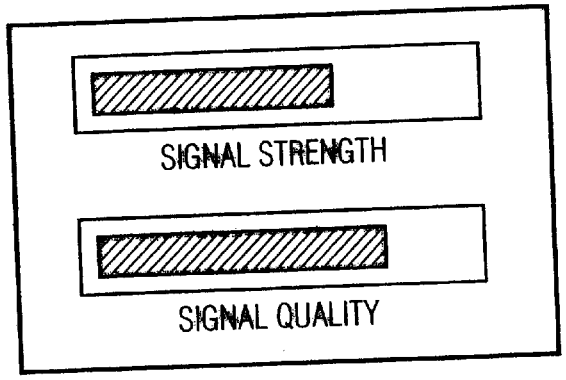
FIGS. 4A and 4B show displays of the quality signal generated by the quality signal processor according to the invention.

FIG. 4A shows a sample display of the SQI signal graph as well as a signal strength graph which are displayed on the display screen 28.

While determining the SQI signal solely from the amount hat the adaptive equalizer is working is an adequate measure of he received signal quality, a more comprehensive indication could be achieved by a combination of the working of the adaptive equalizer, the error rate, as well as other factors. To that end, use may be had of TDA8960, made by Philips Electronics, which is an ATSC compliant demodulator and forward error correction decoder for reception of 8-VSB modulated signals. As shown in the block diagram in FIG. 5, this demodulator/decoder 46 includes the demodulator 18 as well as the adaptive equalizer 20 of FIG. 1. In addition, this demodulator/decoder includes lock detectors 48 which generate signals indicating the demodulator locking to a sync sequence in the video signal (FE LOCK), and the adaptive equalizer locking to the sync sequence (EQ LOCK). The demodulator/decoder 46 includes an I²C controller 50 for accessing and controlling the various elements in the demodulator/decoder 46. To that end, by accessing the I²C controller 50, the weighting coefficients of the adaptive equalizer are available. The demodulator/decoder 46 also includes a Reed-Solomon decoder 52 which performs error correction. Again, also by accessing the I²C controller 50, the operation of the Reed-Solomon decoder 52 may be monitored allowing access to data for determining the error rate.

Figure 5:
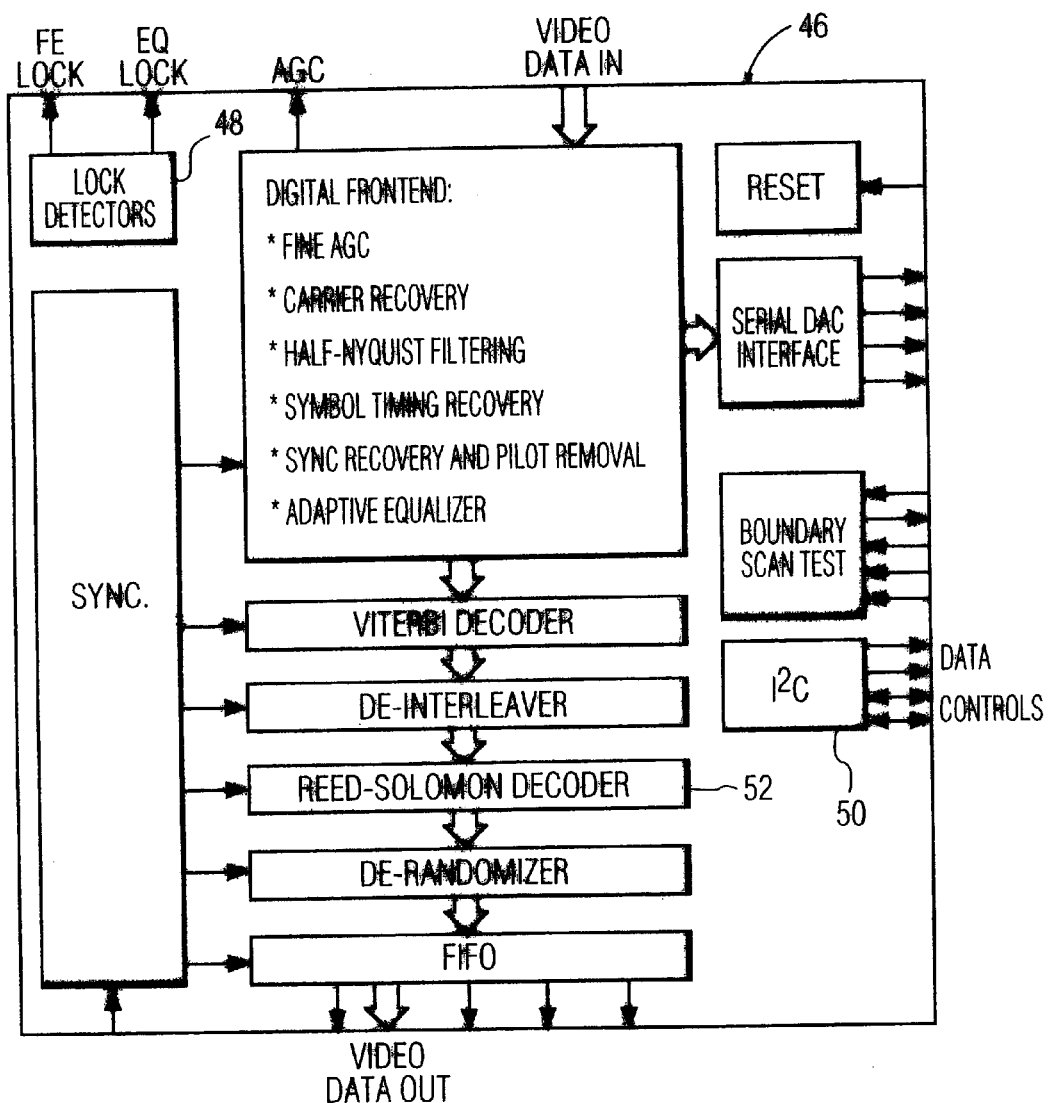
FIG. 5 shows a block diagram of a VSB demodulator and decoder for use in the television receiver of FIG. 1.
Figure 6:
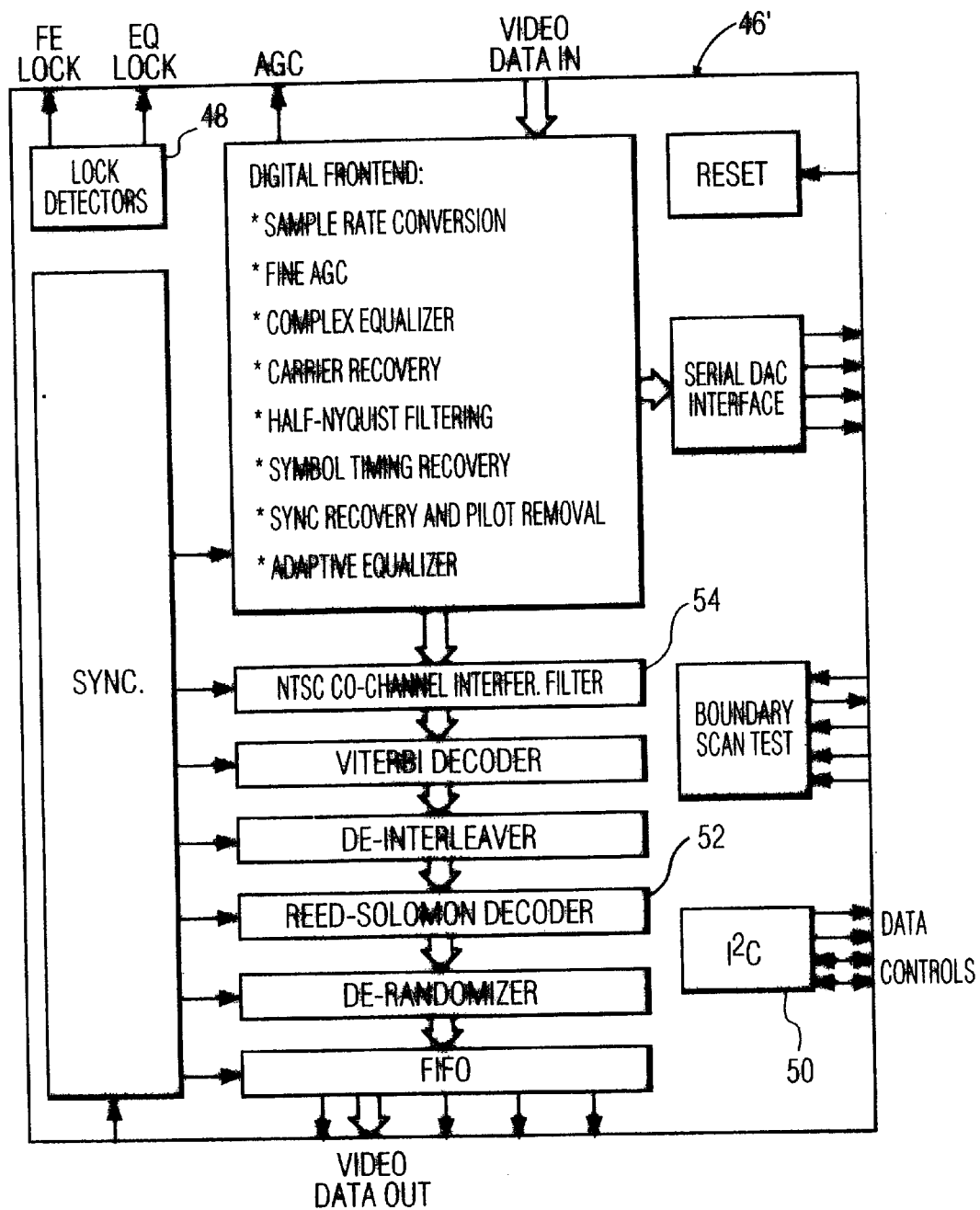
FIG. 6 shows a block diagram of a modified version of the VSB demodulator and decoder of FIG. 5.

FIG. 6 shows a modified version of the demodulator/decoder 46 of FIG. 5. This demodulator/decoder 46' performs a sample rate conversion and a small complex equalization for correcting for short echoes in the channel prior to sync detection, and also includes an NTSC co-channel interference filter 54.

Figure 7:
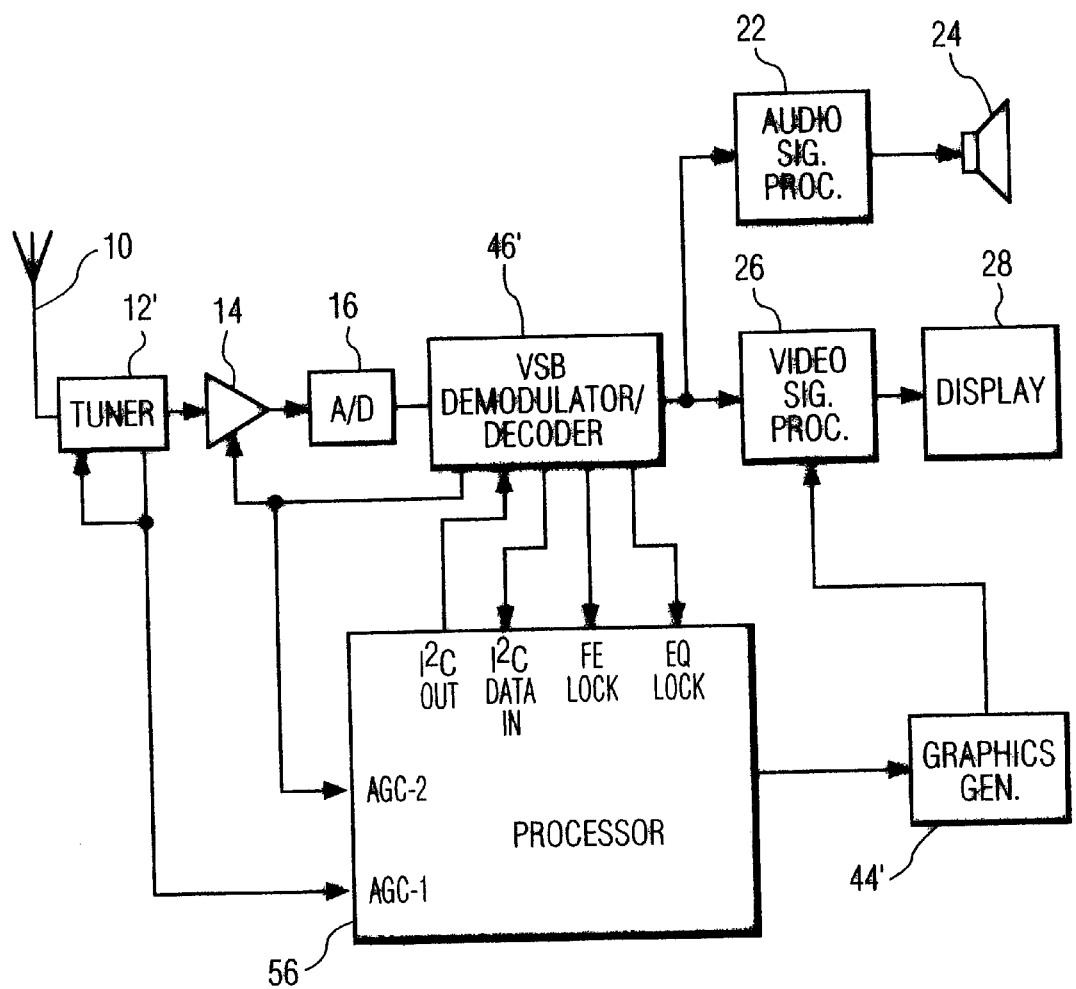
FIG. 7 shows a block diagram of a second embodiment of a quality signal processor according to the invention using the VSB demodulator and decoder of FIG. 6.

The block diagram in FIG. 7 shows the television receiver of FIG. 1 in which the demodulator/decoder 46' of FIG. 6 is used. Again, the antenna 10 receives broadcast video signal. A tuner 12' selectively tunes to one of the video signals. The tuner 12' includes an automatic gain control (AGC) circuit for controlling the tuner gain. Alternatively, the AGC signal may be externally generated. To this end, the tuner 12' has an output port carrying the internally generated AGC-1 signal and an input port to which the output port may be connected. The output from the tuner 12' is connected to the variable gain amplifier 14 which is connected, through the A/D converter 16, to the input of the demodulator/decoder 46'. The output from the demodulator/decoder 46' is connected to the video signal processing circuit 26 for providing color signals for the display screen 28. The quality signal processor now includes a processor 56 which is connected to the demodulator/decoder 46' and receives the signals FE LOCK, EQ LOCK and AGC-2. The processor 56 also receives the signal AGC-1 from the tuner 12'. In addition, in response to inquiries to the I²C controller 50, the processor 56 receives the weighting coefficients as well as the error data. It should be noted that, alternatively, the signals FE LOCK and EQ LOCK may also be obtained through the I²C controller 50.

Figure 4B:
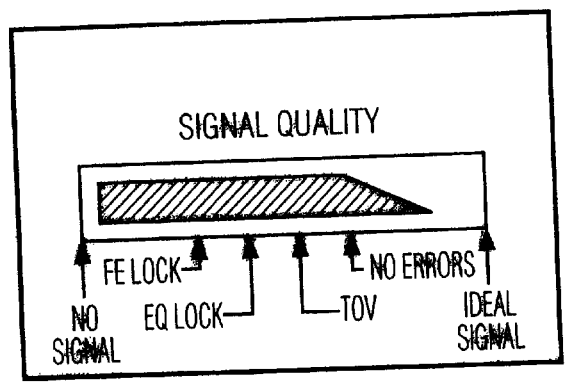

Referring to FIG. 4B, the graphic representation of the signal quality includes the following conditions:

(1) NO SIGNAL—This is where the demodulator is not able to find a valid signal and is not able to achieve lock;

(2) FE LOCK—The demodulator is able to lock onto the sync sequence of the incoming signal (Front End Lock);

(3) EQ LOCK—Both the demodulator and the equalizer are able to lock onto the sync sequence;

(4) TOV—Threshold of Visibility is defined as less than 2.5 segment errors per second. There are still errors but the picture is visually flawless;

(5) NO ERRORS—The demodulator is able to produce a clean data stream with no errors, however, the components in the demodulator/decoder 46' are still working hard; and (6) IDEAL—There are no errors and the components in the demodulator/decoder 46' are only being lightly used.

The quality signal metric is based on a combination of the present state together with the approximate proximity to the next state. For display purposes, a single bar combines both elements, in which:

(a) the main rectangle corresponds to one of the above 6 states, while (b) a triangular portion at the end of the main rectangle corresponds to the quality of the signal above the last state and is proximate to the next state.

There are numerous algorithms that may be used to determine the positioning of the triangular portion between any two states. The following Table represents one such approach:

TABLE 1

| | | | SQI STATE PROXIMITY CALCULATIONS | | | |
|---|---|---|---|---|---|---|
| VARIABLE (X) | NO SIGNAL | FE LOCK | EQ LLOCK | TOV | NO ERROR | COMMENT |
| SNR | — | — | .25 (X/5) | .35 (X/15) | .6 (X/25) | |
| TapEnergy | — | — | .1 (X/10) | .1 (X/15) | .1 (X/18) | |
| EchoEnergy | .2 (X/Y) | .3 (X/Y) | .15 (X/Y) | .15 (X/Y) | .1 (X/Y) | Y = 20% Main Tap |
| SyncEnhancer | .2 (X/Y) | .3 (X/Y) | — | — | — | Y = 20% Main Tap |
| NTSCCoCh | — | — | .1 (X/5P) | .1 (X/10P) | .1 (X/20P) | P = % Main Tap |
| AGC | .2 (X) | .3 (X) | .15 (X) | .1 (X) | .1 (X) | See below |
| ErrorRate | — | — | .25 (X/4) | .2 (X) | — | |
| SSyncConf | .2 (X/8) | — | — | — | — | |
| CR OFFSET | .2 (X) | .1 (X) | — | — | — | See below |
| TOTALS | 1.0 | 1.0 | 1.0 | 1.0 | 1.0 | |

The AGC is determined using the following formula:

$$X=1.0-((|AGC\text{-}1\text{-}2.5|+|AGC\text{-}2\text{-}2.5|)/5),$$

in which AGC-1 and AGC-2 vary between 0 and 5 volts, the intent being to create a signal that is very low (near 0) when the AGC values are near the extremes (0 or 5 V) and close to 1 when the AGC values are near the center (2.5 V).

The TapEnergy is the previously described relation between the weighting coefficients of the adaptive equalizer.

All of the other variables, including SNR (signal-to-noise ratio), EchoEnergy (the amount of relative energy in the channel caused by reflections), SyncEnhancer (a measure of the working of the small complex equalizer), NTSCCoCh (the amount of relative energy used by the NTSC co-channel filter to create a clean signal), SSyncConf (a value representing the number of consecutive times the demodulator/ decoder is able to find a valid sync signal), and CR-OFFSET (Carrier Recovery Offset, a value representing the offset from the ideal carrier frequency to the actual received frequency) are obtained by the processor 56 from the demodulator/decoder 46' using the I²C controller 50.

In the case of CR-OFFSET, the following equation should be used:

$$X=1.0-((\text{Current CR-OFFSET}+\text{CrDiff})/50.0), \text{ and CrDiff}=|\text{previous CR-OFFSET}-\text{Current CR-OFFSET}|.$$

Normally, the CR-OFFSET should be close to 0. However, while the demodulator/decoder will not be adversely affected if it goes up to 10 or 15, as the CR-OFFSET gets closer to 40 or 50, problems will start to show up. Also, if the value varies significantly, this will have a major impact on performance. Therefore, X should be close to 1 when the CR-OFFSET value is close to 0 and not changing, and X should be closer to 0 when the CR-OFFSET value is large and/or is varying significantly.

Using the above algorithms, an SQI signal is able to be generated even before the demodulator has locked onto a signal (Note the factors in column 1 of Table 1 above). This then allows the positioning process to be started at an earlier stage.

The SQI signal may be displayed on the display 26 allowing a user a visual indication of the quality of the received signal, which could then assist the user in orienting the antenna to the proper position. Alternatively, this SQI signal may be used in conjunction with any known automatic antenna positioner.

Numerous alterations and modifications of the structure herein disclosed will present themselves to those skilled in the art. However, it is to be understood that the above described embodiment is for purposes of illustration only and not to be construed as a limitation of the invention. All such modifications which do not depart from the spirit of the invention are intended to be included within the scope of the appended claims.

What is claimed is:

1. A device for generating a signal quality indicator (SQI) signal for indicating a signal quality of a received digital broadcast signal for a digital television receiver comprising an antenna for receiving digital broadcast signals, a tuner for selectively tuning to one of said digital broadcast signals, a variable gain amplifier for amplifying the tuned signal to a predetermined level, a demodulator for demodulating the tuned signal, said demodulator having a control output for supplying an automatic gain control (AGC) signal to the variable gain amplifier, an adaptive equalizer, said adaptive equalizer generating weighting coefficients for adapting the processing in the adaptive equalizer, and signal processing circuitry for processing the equalized tuned video signal, wherein the SQI signal generating device comprises:

means for acquiring the weighting coefficients generated in said adaptive equalizer, wherein said weighting coefficients include a main weighting coefficient and subordinate weighting coefficients;

means for comparing said subordinate weighting coefficients with said main weighting coefficient; and means for generating said SQI signal for indicating the quality of said received digital broadcast signal based on said comparison.

2. A device for generating an SQI signal as claimed in claim 1, wherein said digital broadcast signals are video signals, and said digital receiver is a digital television receiver.

3. A device for generating an SQI signal as claimed in claim 1, wherein said comparing means comprises:

means for determining an RMS value for each of the weighting coefficients;

means for forming a sum of the RMS values for the subordinate weighting coefficients; and means for dividing the RMS value of the main weighting coefficient by the sum of the RMS values for the subordinate weighting coefficients thereby forming the SQI signal, whereby the higher the value of the SQI signal, the less the adaptive equalizer is working and, in turn, the higher the quality of the received digital broadcast signal.

4. A device for generating an SQI signal as claimed in claim 1, wherein said device further comprises a graphics generator for generating a quantitative signal based on said SQI signal, and a display, an output of said graphics generator being applied to said display.

5. A device for generating a signal quality indicator (SQI) signal for indicating the signal quality of a received digital broadcast signal for a digital receiver comprising an antenna for receiving digital broadcast signals, a tuner for selectively tuning to one of said digital broadcast signals, a variable gain amplifier for amplifying the tuned signal to a predetermined level, a demodulator for demodulating the tuned signal, said demodulator having a control output for supplying an automatic gain control (AGC) signal to the variable gain amplifier, an adaptive equalizer, said adaptive equalizer generating weighting coefficients for adapting the processing in the adaptive equalizer, an error detecting/correcting circuit for determining an error rate in the received digital broadcast signal, and signal processing circuitry for processing the equalized tuned signal, wherein the SQI signal generating device comprises:

first means for determining whether the demodulator is able to lock onto a sync sequence in the received digital broadcast signal;

second means for determining whether the adaptive equalizer is able to lock onto said sync. sequence;

means for acquiring the weighting coefficients generated in said adaptive equalizer, wherein said weighting coefficients include a main weighting coefficient and subordinate weighting coefficients;

means for comparing said subordinate weighting coefficients with said main weighting coefficient; and means for generating said SQI signal for indicating the quality of said received digital broadcast signal based on said first determining means, said second determining means, said error rate, and said weighting coefficient comparison.

6. A device for generating an SQI signal as claimed in claim 5, wherein said digital broadcast signals are digital broadcast video signals, and said digital receiver is a digital television receiver.

7. A device for generating an SQI signal as claimed in claim 6, wherein said digital television receiver further comprises:

means for determining a signal-to-noise ratio in the received signal;

means for correcting for short echoes in the channel prior to sync detection;

means for determining an amount of relative energy in the channel caused by reflections;

an NTSC co-channel filter;

means for determining an amount of relative energy used by sand NTSC co-channel filter to create a clean signal;

means for generating a value representing a number of consecutive times that the demodulator is able to find a valid sync signal; and means for generating a value representing an offset of the received signal from an ideal carrier frequency to an actual received frequency;

and said SQI signal generating device further comprises means for generating intermediate values of said SQI signal using at least the following factors: the AGC signal, the signal-to-noise ratio, the amount of relative energy in the channel caused by reflections, the amount of relative energy used to combat co-channel interference, the number of consecutive times that the demodulator is able to find a valid sync signal, and the offset from the ideal carrier frequency to the actual received frequency.

8. A device for generating an SQI signal as claimed in claim 5, wherein said SQI signal is generated even though the demodulator has not locked onto the sync signal.

* * * * *